United States Patent [19]

Fishback

[11] Patent Number: 4,643,471
[45] Date of Patent: Feb. 17, 1987

[54] AUTOMOTIVE VEHICLE DENT PROTECTION DEVICE

[76] Inventor: William I. Fishback, 21090 Red Fir Ct., Cupertino, Calif. 95014

[21] Appl. No.: 798,555

[22] Filed: Nov. 15, 1985

[51] Int. Cl.$^4$ .......................................... B60R 19/00
[52] U.S. Cl. ..................................... 293/128; 280/770
[58] Field of Search ............... 293/128, 126, 1 R, 21; 280/770

[56] References Cited

U.S. PATENT DOCUMENTS

| | | | |
|---|---|---|---|
| 3,540,773 | 11/1970 | Settle | 296/152 |
| 3,550,951 | 12/1970 | Cobbs | 296/152 |
| 3,610,669 | 10/1971 | Morrissey, Sr. | 280/770 |
| 3,610,684 | 10/1971 | Richter | 296/152 |
| 3,831,990 | 8/1974 | Singh | 293/1 |
| 4,353,584 | 2/1982 | Lovett | 293/1 |
| 4,561,685 | 12/1985 | Fisher | 280/770 |

Primary Examiner—Robert R. Song
Attorney, Agent, or Firm—Michael J. Hughes

[57] ABSTRACT

The present invention in its preferred embodiment is a automotive vehicle dent protection device (10) including a pair of shock absorbing elements (12 and 14) joined by connectors (22 and 24). The shock absorbing elements (12 and 14) include of a series of laterally adjacent pockets (18). The pockets (18) are open to the top, allowing easy removal or replacement of the inserts of shock absorbing material (20). This provides both convenient storage and virtually endless revitalization of the shock absorbing capacity of the dent protection device (10). The height at which the shock absorbing elements (12 and 14) hang on the vehicle is easily adjusted by changing the effective length of the connectors (22 and 24). This allows the device (10) to be adaptable to most types of automotive vehicles. The simple construction and operation of the dent protection device (10) provides efficient, complete, yet inexpensive protection for the exterior of a parked vehicle. The device (10) is easily installed and removed and is intended for primary use only when the vehicle is at rest. The dent protection device (10) will be useful to all vehicle owners, and can be distributed through any automotive equipment outlet.

18 Claims, 4 Drawing Figures

AUTOMOTIVE VEHICLE DENT PROTECTION DEVICE

TECHNICAL FIELD

The present invention relates generally to automotive equipment and more specifically to exterior protective devices for use with vehicles.

BACKGROUND ART

The automobile, or other personal vehicle such as pick-ups, vans etc., is held in very high esteem in today's society. Any notice taken of the commute hour traffic patterns of most urban areas, particularly in the South and West, will confirm the position that most people prefer to use an automobile to provide their transportation.

Beyond providing transportation, the appearance of one's car is a source of great pride for many people. Further, the appearance of a car is not only a source of personal pride, but is also a factor in determining the value of an automobile. Therefore it is logical for a person to want to protect the appearance of his car as much as possible. From a purely pecuniary aspect, it is very important to minimize the frequently exhorbitant amounts expended on minor cosmetic repairs.

No matter how careful a person is with his car, he will at some point have to leave it unattended in a parking lot. At this time, the car's side walls become subject to the auto body "ding". The ding is of the family of small yet ever so annoying dents, scratches, and nicks that may be found upon one's return to the car. The ding is the product of a team effort, requiring a parking lot owner who desires to maximize return by cramming as many vehicles as possible into a given area; and a careless driver or passenger who blithely opens his or her door without considering what obstacles may be in its path.

While dings do not affect the functional operation of the car, they do detract from the appearance, and hence the value. Therefore, many devices have been disclosed in the prior art to protect the body portions of automobiles.

The art is replete with devices to be permanently attached either to the side walls or to bumpers of automobiles. These devices, by necessity of appearance, can only cover a small area. While expected areas of damage can be protected, the car is vulnerable to the unusual. For example, side molding provides no protection if the opened door causing the contact is either higher or lower than the door of the parked car. This is especially a problem in areas frequented by those driving "jacked-up" autos or pick-ups. In addition, many cars do not even have side moldings. In many other instances, the moldings are minimal and of no real protective value To combat this problem, larger devices have been disclosed, such as "Lockable Removable Decorative and Protective Panels for Vehicles," described in U.S. Pat. No. 4,353,584 issued to Bruce Lovett on Oct. 12, 1982. This device is essentially a replaceable panel that covers the side walls, hood, or trunk areas of the car. The problem is that the device is designed to be left on the car at all times, so it must necessarily affect the car's appearance and aerodynamics.

The prior art also discloses retractable and removable protectors. One retractable device is the "Retractable Vehicle Door Protector," disclosed in U.S. Pat. No. 3,540,773 issued to Benjamin Settle on Nov. 17, 1970. While the protective portion of the device is retractable, it requires permanent fixtures to anchor it in position.

One device which is both simple and removable is the "Protective Cover," shown in U.S. Pat. No. 3,610,684, issued to Dudley Richter on Oct. 5, 1971. The Richter device is a simple protective sheet designed to be removably hooked on a car door. This device is limited in that it covers a relatively small area, and further that it requires the presence of a C-shaped door handle, which is rare in modern automobiles.

In sum, all the devices in the prior art suffer some serious disadvantage. Either they do not completely protect the desired area, or they require permanent additions which alter the appearance and/or aerodynamics of a car.

DISCLOSURE OF INVENTION

Accordingly, it is an object of the present invention to provide an automobile dent protection device that offers protection for a sufficiently large surface area, yet is easily removable.

It is another object of the present invention to provide a protection device that is easily portable, installable and detachable.

It is a further object of the present invention to provide a protection device that can be readily adapted to virtually any type or size of vehicle.

It is a still further object of the present invention to provide a device in which the shock absorbing material is easily replaceable and, hence, renewable.

Briefly, a preferred embodiment of the present invention is an automobile dent protection device. The functional portion of the present invention is a pair of elongated rectangular shock absorbing elements. The shock absorbing elements are divided into a series of rectangular pouches, closed on three sides with the top being open to accept inserts of shock absorbing material. This allows for simple removal of the shock absorbing material inserts for replacement or storage.

The two shock absorbing elements are attached to each other by means of a pair of connecting devices, preferably ropes or nylon cord. The connecting devices extend between the corresponding ends of the shock absorbing elements.

The end result is that the device can be hung saddlebag fashion over the parked vehicle, with the shock absorbing elements protecting the side walls. The connecting devices are of course adjustable, so that the device can be adapted to accomodate various types and sizes of vehicles.

When the owner is ready to drive his vehicle, he can remove the shock absorbing material so that the device is more readily collapsable, and hence will take up minimal storage space in the vehicle. This allows the owner to keep the device available at all times with minimal inconvenience.

An advantage of the present invention is that it provides complete protection for the side walls of a vehicle.

Another advantage of the present invention is that it is easily removable.

A further advantage of the present invention is that it requires minimal storage space.

Yet another advantage is that it can be adjusted to adapt to virtually any kind of vehicle.

Still another advantage is that the inserts of shock absorbing material are easily removable and replaceable, facilitating storage as well as extending the life of the protective function of the device.

A still further advantage of the present invention is that its simple design makes it very inexpensive and easy to manufacture.

Another advantage is that the device provides a convenient location for the display printed advertising or messages, without altering the original paint job of the vehicle.

These and other objects and advantages wil become clear to those skilled in the art in view of the description of the best presently known mode of carrying out the invention and the industrial applicability of the preferred embodiment as described herein and as illustrated in the several figures of the drawing.

BEST MODE OF CARRYING OUT INVENTION

Figure 1:
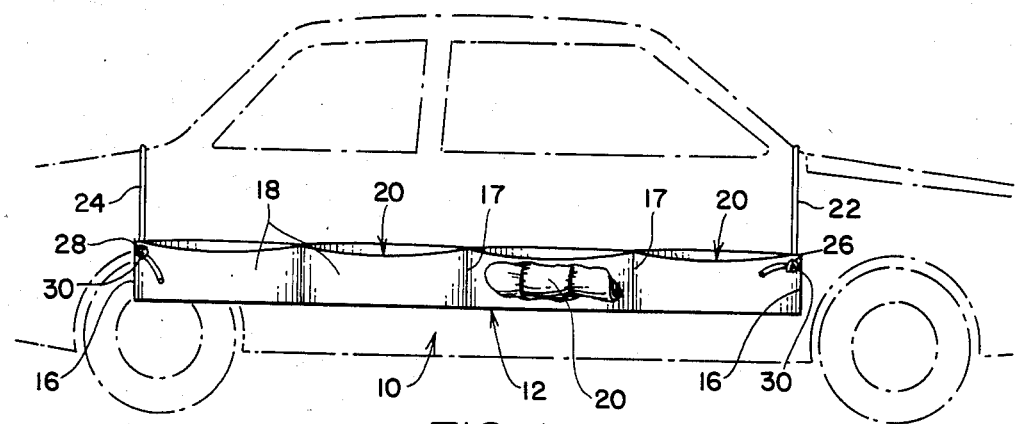
FIG. 1 is a partially cut away right side view of the vehicle dent protection device of the present invention, shown in use on a car.
Figure 2:
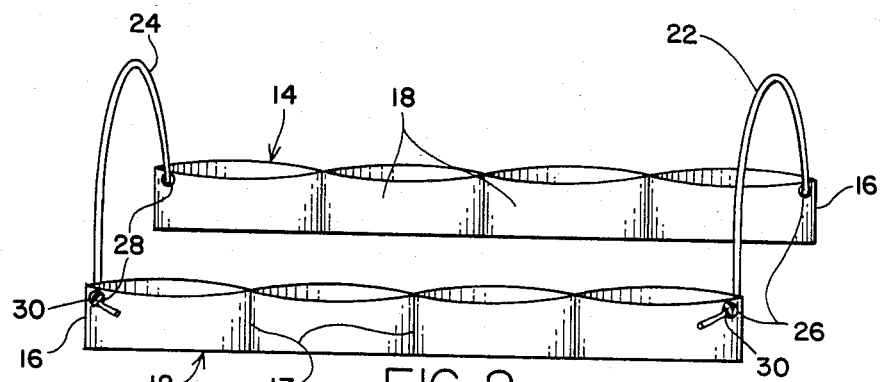
FIG. 2 is a perspective view of the present invention.

The present invention is a vehicle dent protection device. The preferred embodiment, as shown in the several figures of the drawing, and most completely in FIG. 1 and FIG. 2, is adapted to completely protect the side walls of nearly any vehicle, be it automobile, pickup truck, mini-van of the like. The dent protection device is referred to herein by the general reference character 10. The main components of the device are a first shock absorbing element 12 and a second shock absorbing element 14. The shock absorbing elements 12 and 14 are formed from a single sheet of flexible material, preferably a heavy fabric such as canvas, heavy gauge vinyl, plastic or specially fabricated paper products.

The first step of construction is to hem or seal (depending on the material used) the circumference of the sheet of material chosen for the shock absorbers 12 and 14. The single sheet of material is then folded lengthwise and sewn or heat sealed to form an end seam 16 at each of the ends. The resulting absorbers 12 and 14 are each in the shape of an elongated rectangular pouch that is closed on three sides. This elongated pouch is then vertically divided by internal seams 17, to form a series of pockets 18. In the preferred embodiment 10, it is envisioned that there will be five total seams for each absorber 12 or 14, two end seams 16 and three internal seams 17, thereby forming four pockets 18. The end result is that each shock absorbing element 12 and 14 is an unitary series of laterally adjacent pockets 18 formed from a single sheet of material.

The pockets 18 are left open to the top so that an insert of shock absorbing material 20 can be easily introduced into each pocket 18. It is envisioned that in the preferred embodiment, the user will provide his own inserts 20. FIG. 1 is partially cut away to show an insert 20 placed in one of the pockets 18. The material used to form the inserts 20 could be selected from various common items, such as rolled up newspapers, magazines, rubber or foam pads—in short, anything that will deform when struck, and thus absorb shock. A rolled and tied newspaper is illustrated in FIG. 1.

The first and second shock absorbing elements 12 and 14 are connected by a first connecting element 22 and a second connecting element 24. The connecting elements (connectors) 22 and 24 will preferrably be ropes, cords, or straps. In the preferred embodiment, the bond between the connectors 22 and 24 and the shock absorbers 12 and 14 is made by passing the first connector 22 through respective front grommets 26 inserted in the upper front corner of the shock absorbing elements 12 and 14.

Figure 3:
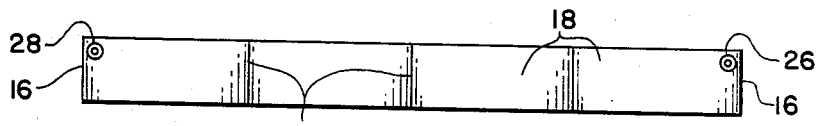
FIG. 3 is a side view of a shock absorbing element.

Similarly, the second connector 24 is passed through respective rear grommets 28 inserted in the upper rear corner of the shock absorbing elements 12 and 14. The positioning of the grommets 26 ans 28 is best illustrated in FIG. 3. A knot 30 is tied in each end of the connectors 22 and 24 to keep them from slipping conpletely through the grommets 26 and 28.

Alternatively, if the device 10 is constructed of plastic or vinyl, the connectors 22 and 24 may be integrally formed with the shock absorbers 12 and 14. An alternate embodiment utilizing a set of integral straps 32 held together in an adjustable manner by a buckle 34 and is illustrated in the left portion of FIG. 4. This would be a typical manner of achieving excellent flexibility and adaptability with a minimal number of components. The number of components can be further reduced by eliminating the buckle 34 and merely tying the straps 32 together as shown on the right side of FIG. 4.

Figure 4:
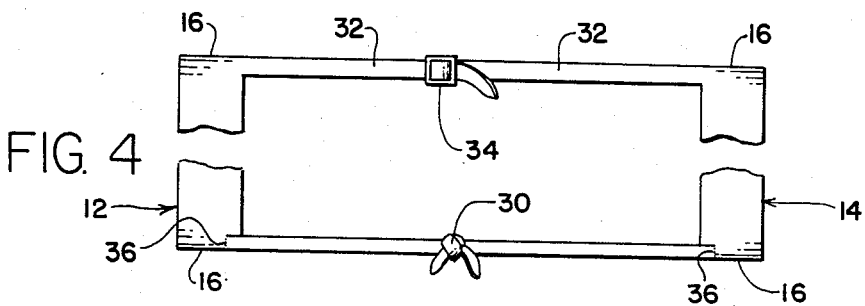
FIG. 4 is a top view, showing alternate embodiments of the connectors.

It is also possible to attach the straps or cords forming the connectors 22 and 24 to the absorbers 12 and 14 by other methods, including an attachment seam 36 sewing technique as shown on the right portion of FIG. 4. Any reasonable method of attachment and fastening should be sufficient.

As shown in FIG. 2, the result of assembling the dent protection device 10 in this manner is a harness or saddlebag type of device suitable for draping over a vehicle. The height at which the device 10 hangs is controlled by the location of the knots 30 or other adjustment elements in the connectors 22 and 24. The preferred connecting elements 22 and 24 are supplied at the maximum expected length of use. Adjustment is then made simply by tying the knots 30 so that the shock absorbing elements 12 and 14 hang at the desired height, ordinarily in about the vertical center of the sides of the vehicle. It is expected that when the dent protection device 10 is in use the connecting elements 22 and 24 will pass over the body of the vehicle at approximately the base of the front and rear windshields. However, there is no reason the connecting elements 22 and 24 could not pass over the roof of the car or the bed of a pickup truck as well.

When the owner wishes to remove and store the device 10, he first removes the inserts 20. This allows the dent protection device 10 to be folded compactly for easy storage in the owner's car. When he parks the car, he merely hangs the dent protection device 10 over his car, and replaces the stored inserts of shock absorbing material 20, or places new inserts 20, in the pockets 18.

In a preferred embodiment of the dent protection device 10, it is expected that the shock absorbers 12 and 14 will be approximately 186 cm (73.2 in) long and 18.4 cm (7.2 in) high. The pockets 18 are 46.5 cm (18.3 in) long and the top opening of the pockets has a maximum width of about 15.2 cm (6.0 in). The grommets 26 and 28 have an interior diameter of 1.1 cm (0.43 in) and are centered 1.9 cm (0.75 in) from the top and sides of the shock absorbing elements 12 and 14. The connecting element 22 and 24 are 0.48 cm (0.19 in) in diameter and roughly 240 cm (94.5 in) long.

As to materials, it is most likely the shock absorbing elements 12 and 14 will be made of canvas or another selected fabric, or vinyl. Chic customers with status symbol vehicles might even select leather. For minimal expense, such as in an advertising promotion, the material could be paper. The connecting elements 22 and 24 will preferably be rope, strap material or nylon cord, but any flexible material will do. The grommets 26 and 28 will be plastic or metal, or simply a heat sealed hole. The seams 16 and 17 will either be stitched, adhered or heat sealed depending on the material chosen. The number and size of the pockets is primarily a matter of choice.

Those skilled in the art will readily observe that numerous modifications and alterations of the device may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The dent protection device 10 of the present invention is designed to be adaptable for use on nearly any kind of vehicle. It will help to avoid annoying "dings" and other minor damage to the sides of the automobile. It is inexpensive and simple to manufacture and use.

The dent protection device 10, in use, is simply draped over the parked car. The connecting elements 12 and 14 are adjusted to hang at the desired level, ordinarily about mid-door. When the device 10 is removed, the inserts of shock absorbing material 20 may be removed to allow more compact storage. The dent protection device 10 will be very inexpensive to manufacture since it is of straightforward construction and utilizes low cost materials. This, combined with its simplicity of operation, should make the device 10 attractive to anyone who wishes to protect the exterior of his car. Further, the device 10 potentially provides a handy place for printed advertising that would not alter the original paint job on the vehicle. This makes it a handy promotional giveaway or discount product.

For the above reasons, it is expected that the automobile dent protection device of the present invention will have widespread industrial applicability. Only a very small fraction of the potential customers need buy for the commercial utility of the present invention to be very widespread indeed.

What is claimed is:

1. An automotive dent protection device, comprising;
first and second shock absorbing elements, each including a series of laterally adjacent pockets, said pockets being open to the top so that shock absorbing material can be inserted therein or removed therefrom; and
connecting means intermediate the first and second shock absorbing elements, the connecting means further providing means to interconnect the shock absorbing elements and to position the respective shock absorbing elements against opposite sides of a vehicle.

2. The device of claim 1 wherein;
the shock absorbing elements are formed from a single folded sheet of material with the pockets being defined by seams being sewn in said folded sheet.

3. The device of claim 2 wherein;
said seams are formed by heat sealing.

4. The device of claim 2 wherein;
said seams are formed by adhesion.

5. The device of claim 1 wherein;
the vertical position of the first and second shock absorbing elements with respect to the sides of the vehicle is adjustable by lengthening or shortening the connecting means.

6. The device of claim 5 wherein;
the connecting means is in the form of multiple ropes; and
the adjustment thereof is accomplished by changing the position of knots in said ropes.

7. The device of claim 5 wherein;
the connecting means is in two portions, each of said portions being integral to the associated shock absorbing element.

8. The device of claim 7 wherein;
the connecting means is in the form of straps; and
adjustment is accomplished by way of a buckle placed in an intermediate position along said straps.

9. The device of claim 1 wherein;
each of the shock absorbing elements includes an adjacent side adapted to rest against the side of the vehicle and an exterior side facing opposite to said adjacent side, such that contact between another vehicle and the device will involve said exterior side; and
said pockets are formed intermediate said exterior side and said adjacent side.

10. The device of claim 9 wherein;
said adjacent side and said exterior side are a part of a continuous surface of a sheet of material folded along the mutual longitudinal border between said adjacent side and said exterior side, said sheet being secured to itself along the lateral borders between said adjacent side and said exterior side.

11. The device of claim 10 wherein;
a total of four pockets are formed in each of the first and the shock absorbing elements by inserting three separate equally spaced lateral seams bonding said material to itself intermediate said lateral borders.

12. The device of claim 10 and further including grommet means inserted near the top of each end of said adjacent side and said exterior side.

13. The device of claim 12 wherein;
the connecting means is selected to be ropelike elements; and
the positiong of the shock absorbing elements is adjusted by placing stop means on the portion of said ropelike elements extending through said grommet means so as to prevent slippage of said ropelike elements through said grommet means.

14. The device of claim 10 wherein
the connecting means is in the form of straps bonded at each end to the respective first and second shock absorbing elements; and
the positioning of the shock absorbing elements is adjusted by buckle means situated along said straps intermediate the shock absorbing elements.

15. A device for protecting the sides of vehicles from abrasion or denting, comprising:

a first elongated protective element in the form of a rectangular trough, open to the top for receiving cushioning inserts therein, and being adapted to rest along one side of the vehicle;

a second elongated protective element similar in structure to the first protective element, adapted to rest along the side of the vehicle opposite the first elongated protective element; and adjustable connecting means extending between the first and second elongated protective elements, the adjustment of said adjustable connecting means having the effect of altering the vertical positioning along the sides of the vehicle of the first and second elongated protective elements.

16. The device of claim 15 wherein
said cushioning inserts are shock absorbing elements adapted for ready removal and replacement.

17. The device of claim 15 wherein
the adjustable connecting means is in the form of ropelike elements; and
the ropelike elements are attached by way of grommets to the first and second elongated protecting elements and the length of the ropelike elements is adjusted by positioning knots thereon.

18. The device of claim 15 wherein
the adjustable connecting means are in the form of straps; and said straps are adjustable in length by way of buckles.

* * * * *